Feb. 20, 1923.
E. W. SALMON, Jr.
FILM STORAGE CABINET.
FILED MAY 31, 1918.
1,445,975.
4 SHEETS—SHEET 1.
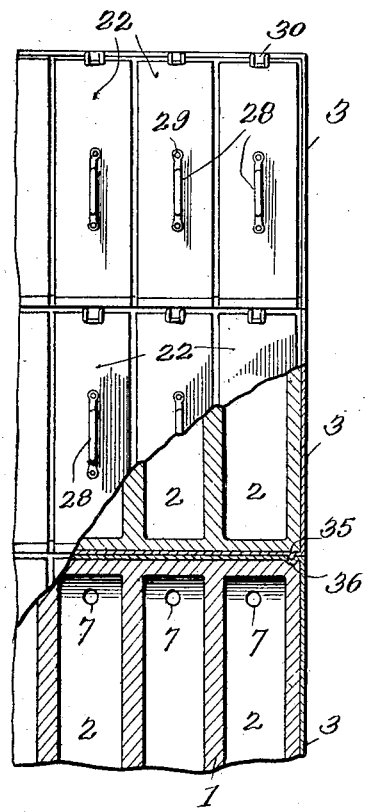
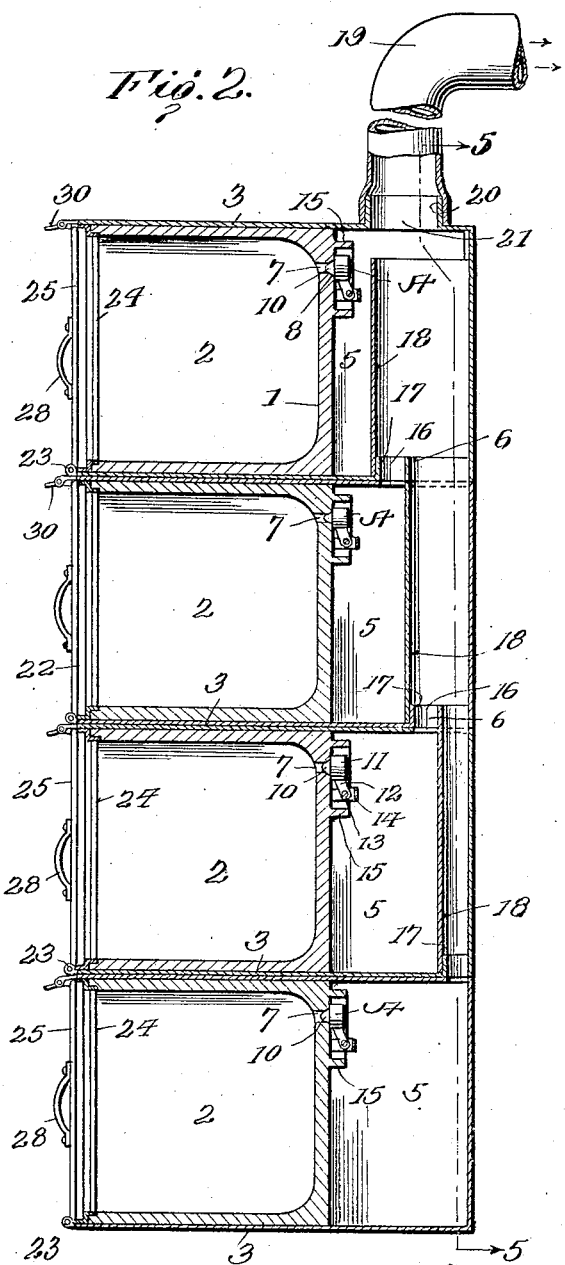
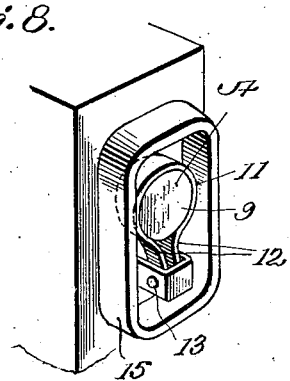
Inventor
Edward W. Salmon, Jr.
By
Attorney

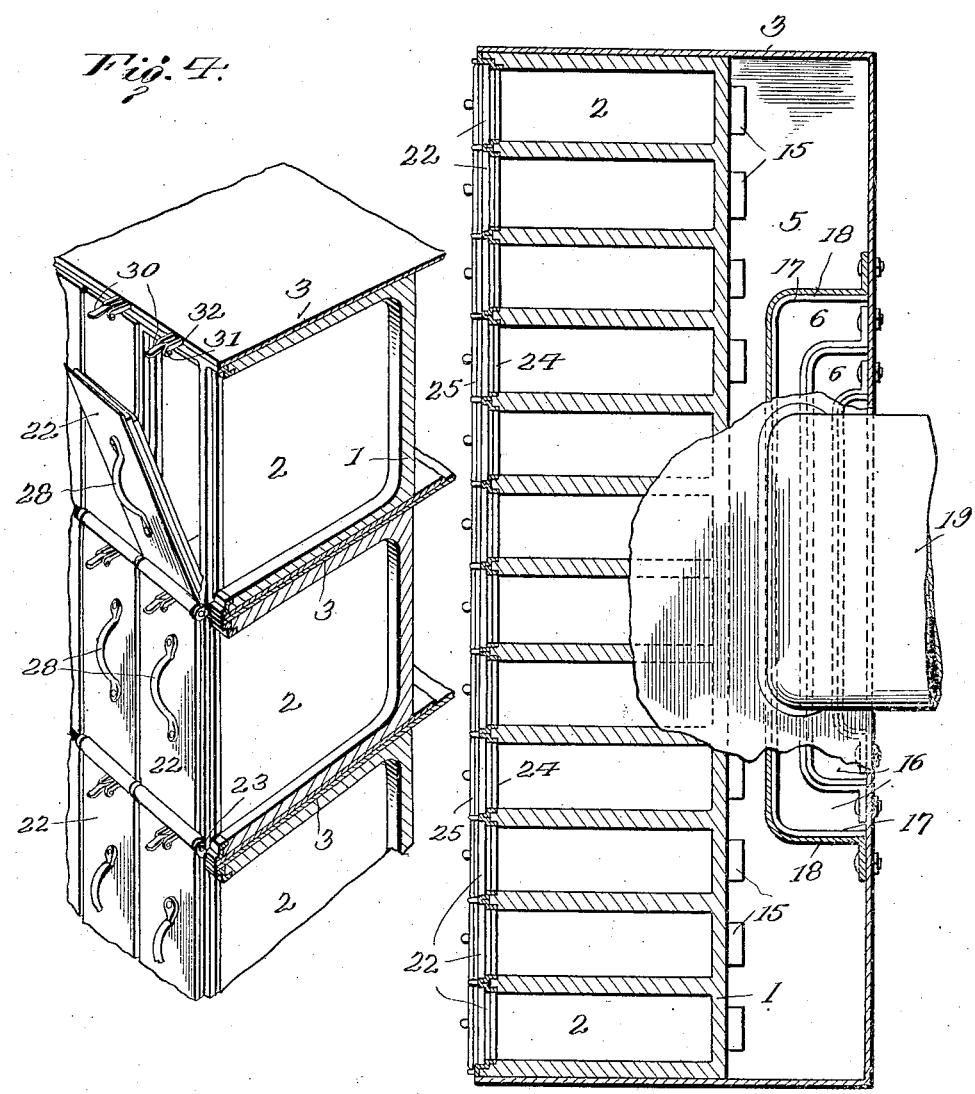

Feb. 20, 1923.
E. W. SALMON, Jr.
FILM STORAGE CABINET.
FILED MAY 31, 1918.
1,445,975.
4 SHEETS—SHEET 3.
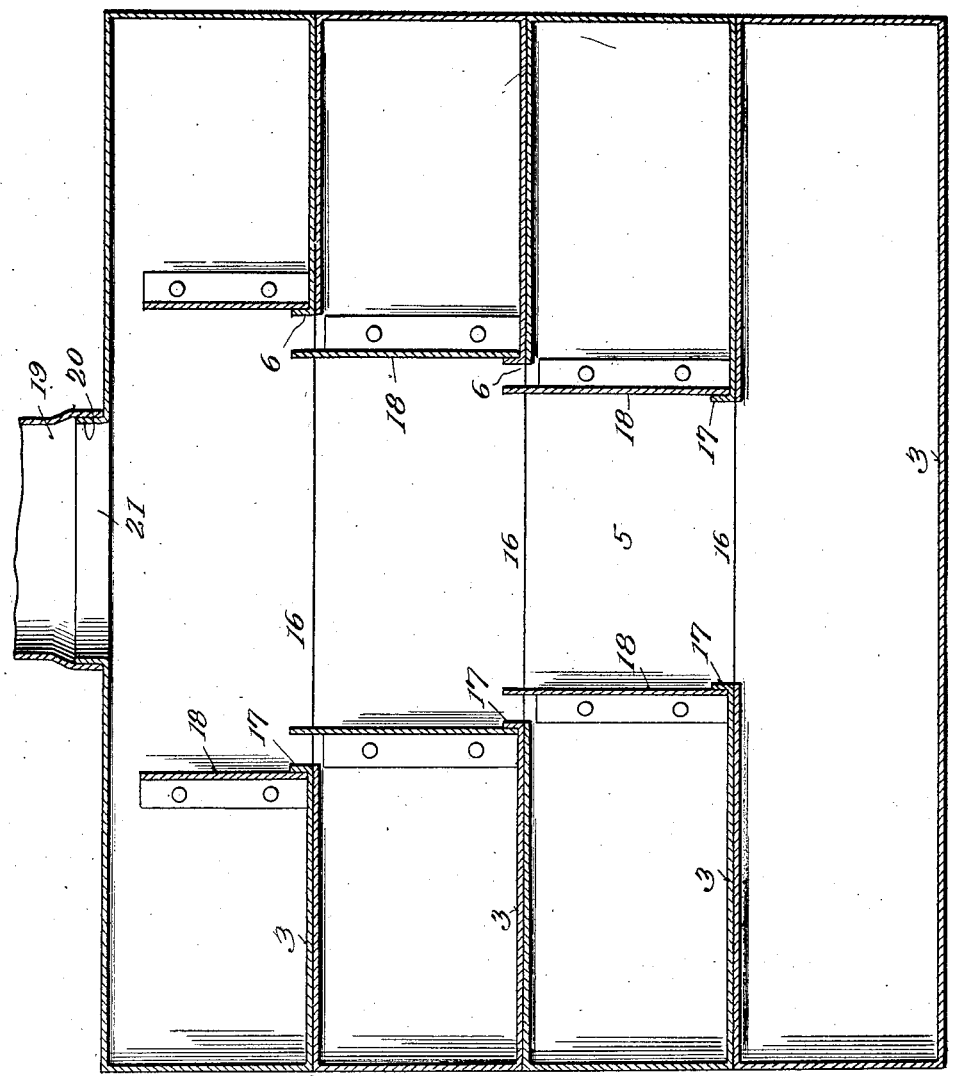
Fig. 5.
Inventor
Edward W. Salmon, Jr.
By 
Attorney Feb. 20, 1923.
E. W. SALMON, Jr.
FILM STORAGE CABINET.
FILED MAY 31, 1918.
1,445,975.
4 SHEETS—SHEET 4.
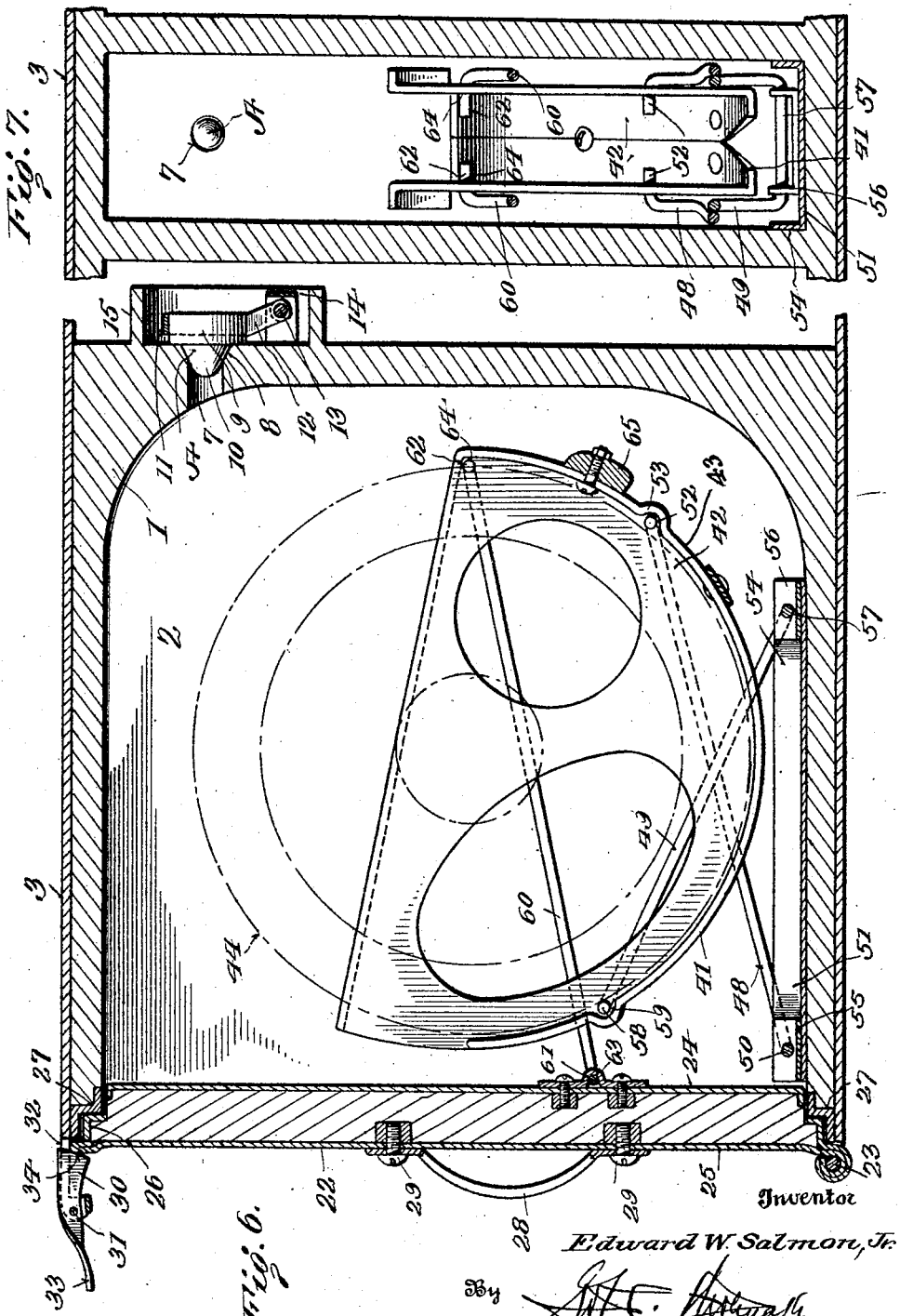

Patented Feb. 20, 1923.

1,445,975

UNITED STATES PATENT OFFICE.

EDWARD W. SALMON, JR., OF BALTIMORE, MARYLAND, ASSIGNOR, BY MESNE ASSIGNMENTS, TO AMERICAN FILM-SAFE CORPORATION, A CORPORATION OF MARYLAND.

FILM-STORAGE CABINET.

Application filed May 31, 1918. Serial No. 237,550.

*To all whom it may concern:*

Be it known that I, EDWARD W. SALMON, Jr., citizen of the United States of America, residing at Baltimore, in the State of Maryland, have invented certain new and useful Improvements in Film-Storage Cabinets, of which the following is a specification.

This invention relates to film storage or filing cabinets or the like.

Motion picture films are composed of highly inflammable material, and once afire, it is difficult, if not impossible, to extinguish or smother the fire. Many films are produced at considerable expense, and oftentimes they are of great value and frequently impossible of reproduction. The protection of the films from fire and other damage and of buildings in which the films are stored has given much concern to those interested in the same. The safety of the public in motion picture houses and buildings in which these picture films are stored has given so much concern to municipalities and to individuals that it has been found absolutely necessary to provide and enforce very strict legislation to provide against the loss of life and property incident to fires. Various types of cabinets, receptacles and buildings have been provided or proposed for the storage and safe keeping of the films but the present requirements of the law are such that the difficulties heretofore experienced have not been effectually met. One of the greatest dangers has resided in the rapid spread of fires in the event of one film after another catching fire and in the quick spread of the fumes and gases in the room or building in which the fire takes place and the consequent impeding of progress in extinguishing or smothering the fire and the hindering of egress from the room or building incident to the fumes, gases and smoke. The films are so susceptible to fire that when one film catches fire the other films in the room become quickly ignited, and in some of the cabinets which have been proposed for the storage or filing of the films, if one of the films in a separate compartment of the cabinet catches fire the fumes and gases spread quickly directly from the compartment in which the fire started to an adjacent compartment, causing further spread of the fire and a consequent further loss of property. As a matter of fact, unless the films of the various compartments are sealed or otherwise protected from heat and flames of a fire in a remote part of the room in which the cabinet is located there is considerable danger of the fire igniting one or more of the films in the various compartments.

It is therefore one object of my invention to provide a fire proof structure for the filing and storing of the films, embodying among other characteristics, a cabinet constructed so that in the event of a fire within the cabinet the gases and other products of combustion are not permitted to enter the room or expand in the cabinet to cause explosions and consequent injury to the cabinet or room or to occupants of the room but by virtue of suitable structural characteristics the gases and fumes are carried quickly away from the burning film out of the cabinet and discharged into the atmosphere outside of the building.

Another object is to provide a storage cabinet composed of sectional units, each section having a plurality of compartments with each unit constructed and arranged whereby in the event of fire in a compartment of one section the products of combustion from such compartment are prevented from entering the room in which the fire occurs and also prevented from entering any other compartment of such section or from entering any compartment of any other sectional unit contained in the structure but on the other hand, my improved structure is such that all the products of combustion from a burning film are released from the compartment under the influence of the pressure of the gases and fumes and conveyed to the atmosphere outside of the building in which the cabinet is located.

A still further object of the invention is to provide a film storage cabinet having a valved outlet operable by internal pressure and adapted to relieve the cabinet of the pressure and fumes and at the same time permit the doors of the compartments to be locked in their closed position thereby preventing gases from entering a room in the event of a film catching fire and which has heretofore been impossible owing to the necessity of leaving the doors free to open to relieve the cabinet of internal pressure in event of the ignition of a film to prevent an explosion that would otherwise occur.

It is still further designed to provide a unitary portable fireproof container for storing combustible material, the container having a fireproof closure, and means whereby to exhaust gases generated by combustion in the container to the outside atmosphere so as to relieve the container of internal pressure and to prevent explosions.

With these and other objects in view the present invention consists in the novel combination, construction and arrangement of parts hereinafter fully described, illustrated in the drawings and pointed out in the claims hereto appended, it being understood that various changes in the size, proportion, form and minor details of construction, within the scope of the claims, may be made without departing from the spirit or sacrificing any of the advantages of the invention.

In the drawings:

Figure 1 is a front elevation of a film storage cabinet constructed in accordance with this invention.

Fig. 2 is a vertical sectional view of the same.

Fig. 3 is a horizontal sectional view of the film storage cabinet.

Fig. 4 is a perspective view of a portion of the film storage cabinet.

Fig. 5 is a vertical sectional view taken substantially on the line 5—5 of Fig. 2.

Fig. 6 is an enlarged sectional view through one of the compartments illustrating the construction of a film spool carrying mechanism.

Fig. 7 is a transverse sectional view of the same.

Fig. 8 is an enlarged detail perspective view illustrating the construction of the valves.

Like numerals of reference designate corresponding parts in the several figures of the drawings.

In the accompanying drawings there is illustrated one embodiment of the invention in which the film storage cabinet is built up of separate units or sections, each comprising a body 1 of diatomaceous earth which is non-combustible and non-heat conducting and in which body is molded or otherwise formed film receiving compartments 2. Each body 1 is arranged within a metallic casing 3 of sheet metal or other suitable material and the compartments are preferably formed by arranging cores within the casing 3 and molding the diatomaceous body around the cores in said casing.

The casing 3 may be of any desired size and is composed of top, bottom, side and rear walls and the body 1 is spaced from the rear wall 4 of the casing to provide a chamber 5 between the back of the body and the said rear wall 4, each chamber having a flanged outlet 6.

The compartments 2 of each section are arranged in a horizontal row, each row or series of compartments having a separate chamber 5 as clearly illustrated in Fig. 2 of the drawings. Each compartment is provided at the upper portion of its rear wall with a valved outlet or vent 7 consisting of an opening flared at the outer or rear portion, as at 8, to form a valve seat with which a gravity acting valve A cooperates. The valve A consists of a circular body 9 of diatomaceous earth having a rounded protuberance 10 to fit the valve seat and arranged within a band 11 having extended terminals 12 which are mounted on a pivot 13. The bands consist of a strip of material and the pivot 13 is mounted in a suitable bracket or support 14 secured to the body of the cabinet below the vent opening and forming an approximately U-shaped loop in which the arms of the strip or band 11 operate. The valve is arranged to close by gravity, the arms 12 being arranged at a slight angle to the rear face of the valve body as shown and the valve is limited in its outward movement by the bracket 14.

In event of internal pressure caused by the burning of a film in one of the compartments the respective valve will open and permit the gas to escape into the rear chamber 5 and thereby effectually preventing any liability of an explosion in the compartment in which the fire has occurred, the gases being thereby prevented from entering the room but caused by expansion and consequent pressure to open the corresponding valve and pass into the respective gas receiving chamber 5 from which latter the gases and other combustion products pass through suitable means to the outside of the building, as will be explained, and by virtue of which the doors of the compartments may be provided with latches to keep the same securely closed so that gases may not escape into the room. Heretofore in certain localities fire underwriters have not permitted latches or locks on the doors because of the necessity of providing against internal pressure and explosion in the compartments in the event of fires.

In order to prevent the gas escaping from any one of the compartments of a section from opening the other valve of compartments of such section and entering the adjacent compartments, each valve A is arranged within a flange 15 extending around the valve and forming a guard or shield for the same. This will effectually prevent any gases escaping from one compartment opening the valves of the adjacent compartments and igniting the films contained therein.

The top wall of each chamber 5 is provided with an opening 16. These openings progressively increase in size from the lowermost chamber 5 to the uppermost chamber and each opening is surrounded by an upstanding flange 17 on which is fitted a pipe 18 of a length to extend from the flanged opening on which it is mounted to the opening of the next higher chamber 5 for conducting any gas from one rear chamber away from the same without permitting the gas to enter the adjacent chamber. The pipes 18 increase in size with the flanged openings and they form a continuous passage which is adapted to permit gas from any of the chambers to pass upward or outward to a pipe or conduit 19 designed to extend through the building wall to discharge the gases to the atmosphere. The pipes 18 may be secured to the rear walls of the chambers 5 in any suitable manner, as for instance, by bolts and nuts, as shown.

The pipe 19 is fitted on a flange 20 surrounding an opening 21 in the top wall of the uppermost cabinet section. The cabinets are designed in practice to be composed of one or any number of sections as requirements may demand and may be made of any desired size and the outlet opening of each chamber 5 above the lowermost one is slightly larger than the upper end of the adjacent pipe 18 to provide a passage or escape for the gas to permit the same to pass out at the top of each chamber and enter the pipe 18 leading therefrom.

Each section is provided at the front with doors 22 hinged at the bottom as at 23 and consisting of a body of diatomaceous earth, and inner and outer plates 24 and 25 constructed of sheet metal or other suitable material and arranged in spaced relation so that there will be an intervening space and a portion of diatomaceous earth between the said inner and outer plates to prevent any direct metallic connection between the exterior and the interior of the compartment so that there will be no liability of heat exteriorly of the compartment being conducted interiorly thereof. The outer plate is provided with a marginal flange 26 which fits against a jamb frame 27 of sheet metal or other suitable material when the door is closed. The door is also provided with a suitable handle 28 having fastening devices 29 embedded in the body of the door and terminating short of the inner plate of the same. The door jamb frame which extends over the entire front of the casing is provided at each compartment with a door opening and it is suitably secured to the top, bottom and end walls of the casing, as for instance, by "spot" welding or otherwise. The door jamb may be formed in one piece or in separate pieces.

The door is preferably secured in its closed position by a gravity catch or latch 30 pivotally mounted on a pin or rivet 31 which is carried by a suitable bracket or support 32 projecting from the front of the cabinet at the top of each compartment. The pivoted gravity latch, which is provided with an outwardly extending operating handle 33, has an inclined or beveled inner end edge 34 arranged to engage the upper edge of the door with a wedging action, the downward movement of the inner engaging portion of the latch being limited by the door so that the clamping action will increase with the downward movement of the latch. This will enable the door to be securely locked in its closed position without the use of spring devices liable to be affected and rendered inoperative by heat. The latches operate automatically when the doors are closed and any internal pressure will be caused to operate the valve and escape.

It will be seen that the contents of each section of the cabinet are protected by a continuous wall of diatomaceous earth and it has been found by actual tests that the diatomaceous earth will effectually prevent films contained within the cabinet from being ignited by heat exterior of the cabinet and that a film may be ignited in any one of the compartments without liability of setting fire to films contained in the adjacent compartments. Also it will be clear that there will be no liability of an explosion and consequent damage to the cabinet should a film become ignited in any one of the compartments as the gas will be vented and carried away from the cabinet and prevented from entering any of the other compartments.

The sections of the cabinet are portable and may be detachably interlocked by coacting projections 35 and sockets 36 but any other desired construction may be employed, and instead of constructing the cabinet in separable sections a single unit or cabinet may be made of any desired size and any number of compartments may be provided. Single portable compartment cabinets may also be provided, such preferably having, however, a latched door and an automatically operable valved vent such as that described so as to provide for the escape of fumes and gases to the atmosphere in the event of ignition of a film in the compartment.

Each compartment may be equipped with means for holding a film spool and the film spool carrying device may comprise in its construction a segmental truncated cylindrical holder 41 constructed of suitable material preferably sheet metal and composed of spaced sides 42 and a curved peripheral connecting portion 43 connecting the sides at the front, rear and bottom edges thereof, the holder being open at the top to enable a film spool 44 to be readily placed therein and removed therefrom when the door of the compartment of the film storage cabinet is open. The holder 41 which has a floating action is supported by crossed oppositely inclined links 48 and 49 which are substantially oblong. The front link 48 which extends upwardly and rearwardly is composed of spaced sides and a connecting transverse pivot portion 50 located at the front of a base plate 51. The rear or upper terminals 52 of the sides of the link 48 are bent inwardly to form pivots which are arranged in a suitable bearing 53 located at the back of the holder below the horizontal plane of the center of the same when the door is closed. The base plate 51 is constructed of sheet metal or other suitable material and it is arranged upon the bottom of the compartment being provided with side flanges 54 and having front and rear bearings 55 and 56. The rear link 49, which is composed of spaced sides and the transverse pivot portion 57 extends upwardly and forwardly from the rear bearing 56 to the front portion of the holder and its upper or front terminals 58 are bent inwardly at right angles to form pivots and are arranged in a suitable bearing 59 at the front of the holder 41 when the door is closed.

By the above arrangement of links or levers the holder is supported for a floating action and when it is drawn forwardly by the downward swinging movement of the door it is partially rotated through the operation of the crossed links or levers 48 and 49 to carry the open top to the front and arrange the open top at an inclination at the open front of the compartment to afford ready access to the film spool and enable the same to be easily placed in and removed from the holder. The inward and outward movement of the holder is noiseless and the holder is connected with the door by a substantially oblong link 60 composed of spaced sides and front and rear connecting portions 61 and 62, the front connecting portion being mounted in a suitable bearing 63 of the door and the rear connecting portion 62 being arranged in a suitable bearing 64 at the back of the holder. The transverse portions 61 and 62 form pivots and the connecting link 60 is arranged at a slight inclination and extends upwardly and rearwardly from the lower portion of the door when the latter is closed and in this position of the door and the holder, the link 60 is located below the horizontal plane of the center of the holder. The upper rear end of the connecting link is connected to the holder at the back thereof adjacent to the upper edges of the same and the open top of the holder is disposed at a slight rearward inclination when the door is closed.

The door will close by gravity and the automatic closing action of the door through the operation of the film spool carrying mechanism may be increased by providing the rear portion of the holder with a suitable weight 65 which may be of any desired size and which may also be secured to the back of the holder in any desired manner. A rotary and backward and forward movement of the film spool holder enables the same to be withdrawn from the compartment by the outward and downward swinging of the door without any material upward movement of the holder and it is not necessary to materially increase the height of the compartment which is also slightly in excess of the diameter of the film spool. Also by partially rotating the holder to turn the open top to the front when the door is opened, it is unnecessary to withdraw entirely the holder from the compartment and the backward and forward movement of the holder is thereby reduced to a minimum. No claim is made in the present application to the film spool carrying mechanism as this invention forms the subject matter of a companion divisional application.

What I claim is:

1. A film cabinet for the storage of combustible films, including a seamless outer casing of non-combustible, non-heat-conducting material, a body of like material formed en bloc arranged within the casing and having a compartment and provided at the front thereof with a door of non-combustible, non-heat conducting material, said compartment having an outlet, and a valve of non-combustible, non-heat conducting material normally closing the said outlet and adapted to open only in the event of excessive pressure in the compartment incident to ignited combustible gases due to fire in said compartment, whereby the entire cabinet and compartment including the valve is not damaged in the event of fire incident to the ignition of the combustible gases, and whereby the walls and door are relieved of strains incident to the internal pressure or internal explosions in the event of fire.

2. A film storage cabinet including a body of non-combustible and non-heat conducting material provided with an outlet at its upper rear portion, a door at the front of the cabinet, a valve for said outlet, and an external flange surrounding said valve to form a guard for the valve.

3. A cabinet for the storage of combustible films including a seamless outer casing of non-combustible, non-heat conducting material, a body of like material formed en bloc and arranged tightly within the casing and having a compartment provided at the front thereof with a door of non-combustible, non-heat conducting material, said compartment having an outlet, and a valve normally closing the said outlet and adapted to open only in the event of excessive pressure in the compartment incident to fire due to the ignition of the combustible gases, whereby the walls and door are relieved of strains incident to the internal pressure or internal explosions in the event of fire.

4. A film storage cabinet including a casing, a body of non-combustible, non-heat conducting material arranged within the casing, said body being composed of separable, super-imposed units of film-receiving compartments, the compartments each having an outlet, a valve normally closing each outlet, a pipe leading from the casing to the outside atmosphere, and means for conducting the gases of the compartments of one unit away from the valves of compartments of other units and to conduct them to the pipe leading to the outside atmosphere, whereby gases from the compartments of one unit may pass to the outside atmosphere without endangering the rear walls of the compartments of other units.

5. A film storage cabinet comprising a body of non-combustible and non-heat conducting material provided with a compartment and having a door of similar material at the front thereof, said door being recessed at the edge, a metallic jamb frame arranged at the front of the compartment, and composed of inner and outer flanges and a connecting angularly related web, and spaced inner and outer angle plates secured to the door, the outer plate being arranged to fit against the inner face of the jamb frame and the inner plate being spaced from the jamb frame when the door is closed.

6. A film storage cabinet including a casing open at its front, a hollow body fitted tightly in the casing and forming a compartment within the casing and spaced from the back thereof to provide an intervening space, a door for said compartment, the compartment having an outlet leading into said intervening space, and a pipe extending from the casing whereby gases generated in the compartment will pass through said opening and into said intervening space and out through said pipe, and thereby relieve the door of the compartment of pressure.

7. A film storage including a casing open at the front, a body of non-combustible and non-heat conducting material arranged within the casing and spaced from the back thereof to provide an intervening space, said body being provided with film receiving compartments and having outlets communicating with the said rear space, means for dividing the rear space into separate rear chambers, a pipe or conduit extending from the casing at the top thereof and a plurality of pipes arranged to connect the separate chambers or compartments with the said pipe or conduit.

8. A film storage cabinet including a casing open at the front, a body of non-combustible and non-heat conducting material arranged within the casing and spaced from the back thereof to provide an intervening space, said body being provided with film receiving compartments and having outlets communicating with the said rear space, horizontal partitions dividing the said rear space into separate chambers and provided with openings progressively increasing in size from the bottom to the top and pipes also increasing in size with the openings and connected therewith to form passages for conveying away gas and other products of combustion.

9. A film storage cabinet including a casing open at the front, a body of non-combustible and non-heat conducting material arranged within the casing and spaced from the back thereof to provide an intervening space, said body being provided with film receiving compartments and having outlets communicating with the said rear space, horizontal partitions dividing the said rear space into separate chambers and provided with flanged openings progressively increasing in size from the bottom to the top, and a plurality of pipes arranged in substantial vertical alinement and fitted on the flanged openings.

10. A film storage cabinet including a casing open at the front, a body of non-combustible and non-heat conducting material arranged within the casing and spaced from the back thereof to provide an intervening space, said body being provided with film receiving compartments and having outlets communicating with the said rear space, horizontal partitions dividing the said rear space into separate chambers and provided with flanged openings progressively increasing in size from the bottom to the top, a plurality of pipes arranged in substantial vertical alinement and fitted on the flanged openings, and a pipe or conduit connected with the casing above the said pipes.

11. A film storage cabinet including a casing open at the front, a cabinet body of non-combustible and non-heat conducting material arranged within the casing and spaced from the back thereof to provide an intervening space, said body being provided with a plurality of rows of film-receiving compartments and having outlets at the back thereof communicating with the said space, horizontal partitions located at the intervals between the rows of compartments and dividing the said space into separate rear chambers to provide a separate rear chamber for each row of compartments, valves for normally closing the said outlets, a pipe or conduit connected with the casing at the top of the said space and separate pipes extending from the said chambers and communicating with the said pipe or conduit for conducting gas from any one of the said chambers without permitting the same to pass into the other chambers.

12. A film storage cabinet including a cas-